A. P. WOLFE.
COOLING DEVICE FOR THE WATER CIRCULATION OF AUTOMOBILE ENGINES.
APPLICATION FILED NOV. 20, 1912.
1,141,511. Patented June 1, 1915.
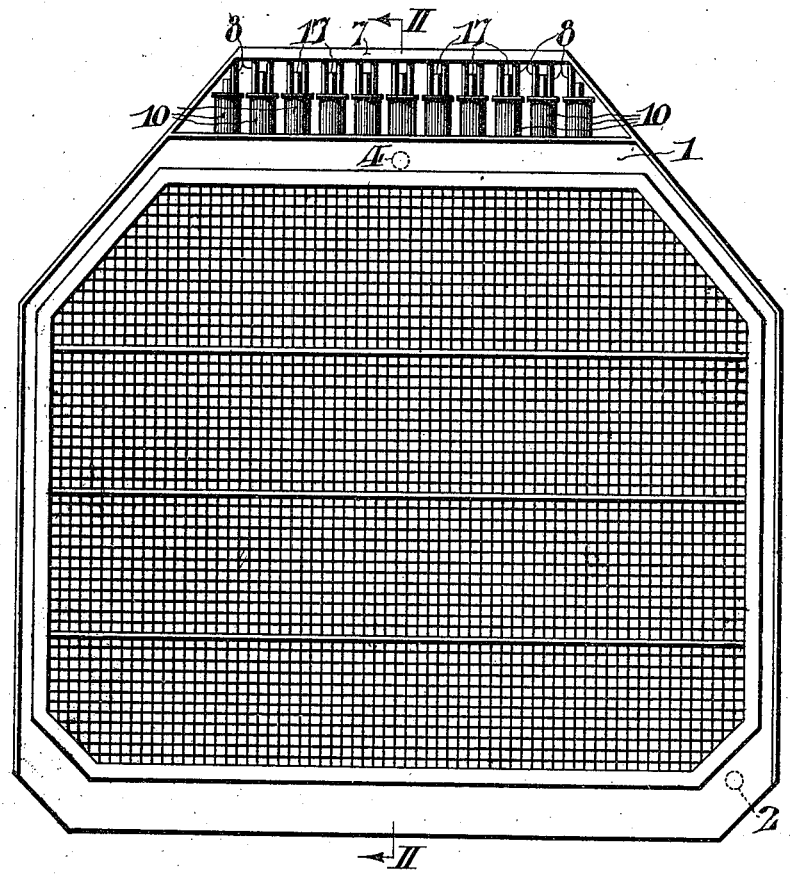
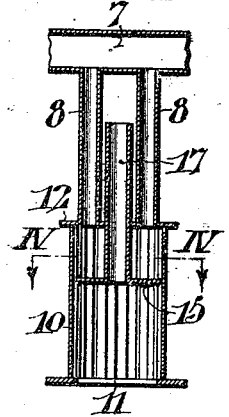
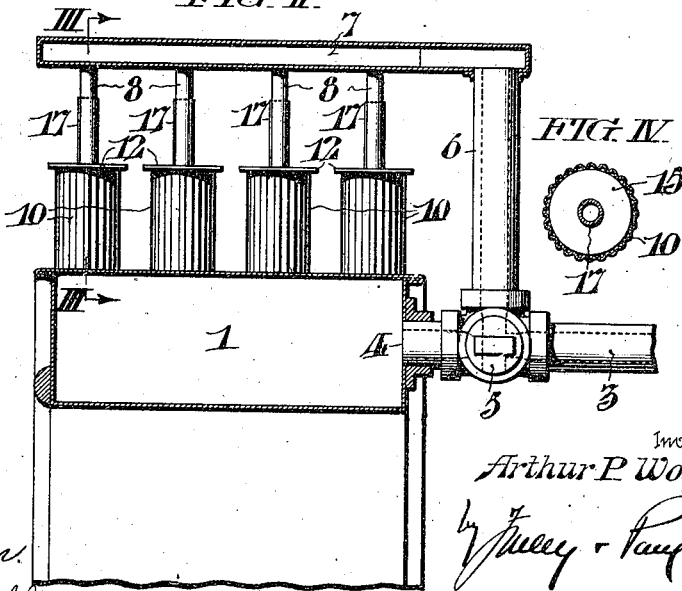
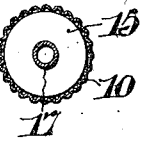
Inventor
Arthur P. Wolfe,
Witnesses
John C. Bergner
James H. Bell
Attorneys

UNITED STATES PATENT OFFICE.

ARTHUR P. WOLFE, OF VINELAND, NEW JERSEY.

COOLING DEVICE FOR THE WATER CIRCULATION OF AUTOMOBILE-ENGINES.

1,141,511. Specification of Letters Patent. Patented June 1, 1915.

Application filed November 20, 1912. Serial No. 732,415.

*To all whom it may concern:*

Be it known that I, ARTHUR P. WOLFE, of Vineland, in the county of Cumberland and State of New Jersey, have invented certain new and useful Improvements in Cooling Devices for the Water Circulation of Automobile-Engines, whereof the following is a specification, reference being had to the accompanying drawings.

My invention relates to a cooling device which may be used to supplement, or if desired to take the place of the ordinary radiator apparatus now employed in automobiles. By my device the heated water which has been pumped from the water jacket of the engine, is subdivided into a number of fine streams which are caused to pass in the form of films or sprays in contact with air at atmospheric pressure. I find that the heated water is more rapidly cooled when in contact with air at atmospheric pressures than when passed through the ordinary radiator. By my device I am further able to effect this spraying of the water without any objectionable escape of vaporized water. This I accomplish by sufficiently prolonging small atmospheric vent tubes to permit condensation within them of any vapor which would otherwise escape.

In the accompanying drawings, Figure I, is a front elevation of an automobile radiator having my device applied thereto. Fig. II, is an enlarged sectional view along the line II, II, of Fig. I, showing my device including the connections for the water circulation. Fig. III, is a sectional view of one of the cooling units employed in my device on a still more enlarged scale. Fig. IV, is a cross section along the line IV, IV, in Fig. III.

Referring to Fig. I, there is shown in front view an ordinary radiator of which 1, is the upper reservoir shown in cross section in Fig. II, from which the water passes in a number of thin sheets between the walls of the grid to the lower part of the reservoir where it is drawn off at 2, and returned to the water jacket of the engine, whence it is returned by a pipe 3, entering the reservoir 1, at 4. A valve 5, is interposed in this pipe whereby, when it is desired to employ the device which I am about to describe, said pipe may be closed and the returning heated water diverted to an upright pipe 6, which feeds into a head or manifold 7, extending over the top of the radiator. From the head 7, there descend a large number of small water pipes 8, the total sectional area of these pipes being greater than that of the water supply pipe so as to permit expansion therein.

Mounted on top of the upper surface of the radiator, and in free communication therewith are a series of drums 10, having corrugated metal peripheries. The lower end of each drum has a large aperture 11, opening into the interior of the reservoir 1, while the upper end of each drum is closed by a plate 12, which receives a plurality (as shown in the drawings, two) of the water pipes 8, so that as shown each pair of water pipes 8, is continually discharging streams of heated water into the drum 10. An annular disk 15, is set horizontally across the drum at a convenient distance from its top and operates as a baffle plate, its circular edges reaching to the inner edges of the corrugated periphery of the drum, leaving free spaces all around corresponding with each corrugation, so that the streams of water descending through the pipes 8, after striking this disk or baffle plate are broken up and forced to descend around its edges in the form of a multiplicity of very fine streams one occupying the region of each corrugation and descending therein to the bottom of the drum and thence to the interior of the reservoir 1.

A vent tube 17, is set within each disk 15, centrally and passes upward through the plate 12, at the top of the drum and a short distance above, as shown clearly in Fig. III. This vent tube permits free access of air at atmospheric pressure to the interior of the drum, so that the descending streams or films of water are in contact with air at atmospheric pressure. The vent tubes further suffer some escape of vapor or steam, passing off from the water, but the tube is long enough and (being exposed to the atmosphere) cool enough, to effect the recondensation of such vapors before they leave the upper end in any substantial quantity, the recondensed vapor dripping back into the drum and thence into the reservoir.

By the operation of my device, as shown, when it is found that sufficient cooling of the circulatory water system is not effected by the ordinary radiator of the automobile as frequently occurs in hot weather, or when operating continually under heavy loads, the valve 5, is turned so as to throw the water circulation through the cooling apparatus which I have invented. The effect of this is that the heated water is subdivided into a large number of independent streams and these streams broken up as they descend around the edges of the baffle plates, into a very large number of fine films which descend in contact with the walls of the drums and also in contact with air at atmospheric pressure. The cooling effect thus secured is very much greater than where a sheet of water descends without free access to air between metal surfaces as occurs in the ordinary radiator. It will be understood that the number of drums mounted upon the reservoir may vary as circumstances require. In the drawing I have shown a small cooling apparatus involving four rows of thirteen each, but ordinarily a larger number is employed. These drums may be of any convenient size. I have found that drums rather deeply corrugated and about three-quarters of an inch in diameter answer very well.

Although I have shown a cooling device which I have employed with success, yet it will be understood that I do not confine the application of my invention to the particular device shown. In principle I believe that I have adopted a new method of cooling to the water circulation apparatus of an automobile engine, which method involves permitting the heated water to pass in very fine films or streams in contact with air at atmospheric pressure.

I find that a comparatively short amount of travel by a very thin film of water in contact with air under such conditions as I establish, effect more cooling of the liquid than is accomplished by a similar travel of the water under other conditions which have been employed.

Although I have shown my device as auxiliary to and supplemental to the ordinary radiator cooler, yet it will be understood that my invention is not thus limited to a supplemental cooling device, but that to any extent that may be desired my cooling apparatus may be used to take the place of the radiators or other cooling devices heretofore used. There is however, a distinct advantage to be obtained in using my device as supplemental to a radiator, in that it is thereby possible without changing the amount of water which is in circulation, to increase or decrease the extent of the surface of the water exposed to radiation of its heat.

Even though the valve be turned so that the water circulation passes only through the radiator, the advantages secured of maintaining such circulation at atmospheric pressures, and any substantial escape of vapor, is prevented by recondensation of the same in the vent tubes.

Having thus described my invention, I claim:

1. A cooling apparatus for the water circulation of an automobile engine, including devices the outer surfaces of which are subjected to cooling air, devices for subdividing the water to be cooled into fine streams and directing the same to said air-cooled devices, and means for subdividing said streams into fine films on the inner surfaces of the air-cooled devices, said devices being closed at the sides and open at the top for permitting free access of air to the interior of each of said air-cooled devices, whereby the water to be cooled is maintained at atmospheric pressure.

2. A cooling apparatus for the water circulation of an automobile engine, including devices the outer surfaces of which are subjected to cooling air, devices for subdividing the water to be cooled into fine streams and directing the same to said air-cooled devices, a tube extending from each air-cooled device and open to the atmosphere to permit free access of air to the interior of said devices, said tubes extending above said devices, whereby the water vapors passing from the devices with the air will be condensed in the tubes and returned to said devices, and means supported by the tubes in the air-cooled devices for subdividing the streams into fine films on the inner faces of said air-cooled devices.

3. A cooling apparatus for the water circulation of an automobile engine, including a series of drums having their outer surfaces exposed to the air, a pipe connected with the top of each drum for directing a stream of water thereto, means for dividing and directing the stream of water in each drum against the interior surface of the drum, and a pipe for each drum which extends therefrom and is open to the atmosphere for permitting access of air to the interior of the drum and for condensing the vapors passing from the drum with the air and returning said water vapors to the drum.

4. A cooling apparatus for the water circulation of an automobile engine, including a series of metal drums having corrugated peripheries, the outer surfaces of said drums being exposed to the air, devices for directing the water to be cooled in sub-divided streams into said drums, means for directing said streams against the inner periphery of the drum, whereby they are sub-divided into fine films, and means for permitting free access of air to the interior of said drums.

5. A cooling apparatus for the water circulation of an automobile engine, including a series of metal drums having corrugated peripheries, a pipe for each drum for directing the water to be cooled into the drums, a baffle plate in each drum for directing the water discharged therethrough against the corrugated periphery of the drum, whereby the water is sub-divided into a plurality of fine films, a tube connected to each baffle plate, and extending from the drum for permitting free access of air to the drum beneath the baffle plate.

6. A cooling apparatus for the water circulation of an automobile engine, including a header adapted to receive the water to be cooled, a radiator, a plurality of drums between the radiator and the header, a pipe for directing the water from the header into each drum, devices for sub-dividing the water received in each drum into fine films, a pipe leading to the top of the radiator, and a pipe leading to the header, and a valve, whereby the water to be cooled may be passed direct to the top of the radiator, or may be passed through the header and the drums to the top of the radiator.

7. A cooling apparatus for the water circulation of an automobile engine, including a header adapted to receive the water to be cooled, a radiator, a plurality of separate and independent cooling devices between the radiator and the header, said devices including means for dividing the water to be cooled into fine films, and means for permitting free acess of air to the water being cooled, a pipe leading to the top of the radiator, a pipe leading to the header, and a valve whereby the water to be cooled may be passed directly to the top of the radiator, or may be passed through the header and the independent cooling devices to the top of the radiator.

In testimony whereof, I have hereunto signed my name at Philadelphia, Pennsylvania, this nineteenth day of November, 1912.

ARTHUR P. WOLFE.

Witnesses:
JAMES H. BELL,
E. L. FULLERTON.

Copies of this patent may be obtained for five cents each, by addressing the "Commissioner of Patents, Washington, D. C."